C. F. WEEBER.
TRACTION DEVICE.
APPLICATION FILED DEC. 29, 1915.
1,202,460.
Patented Oct. 24, 1916.
2 SHEETS—SHEET 1.
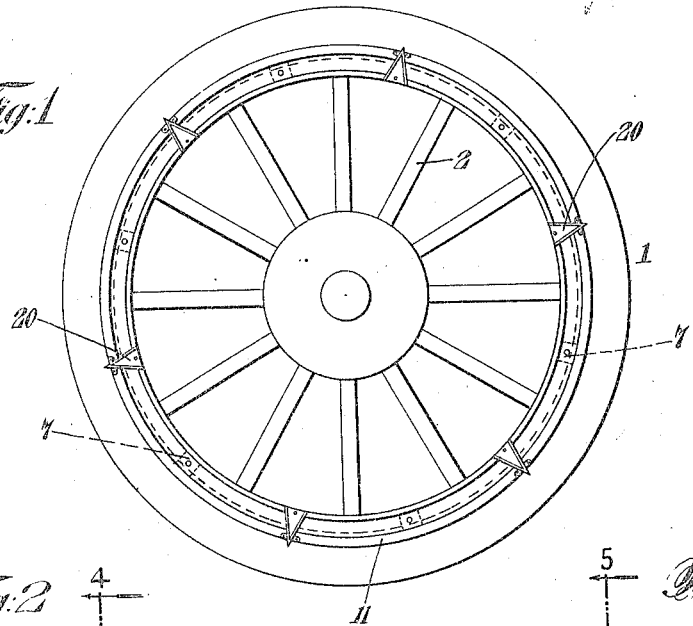
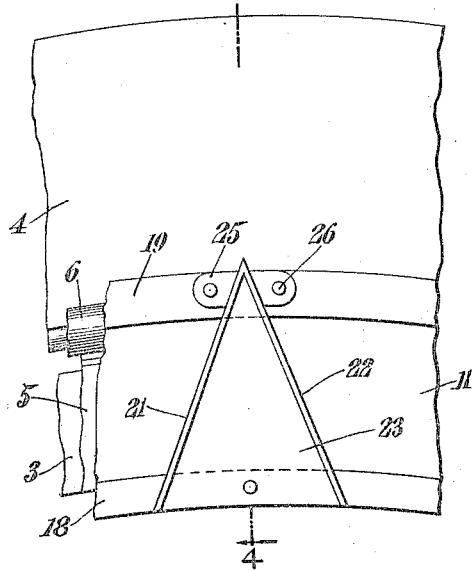
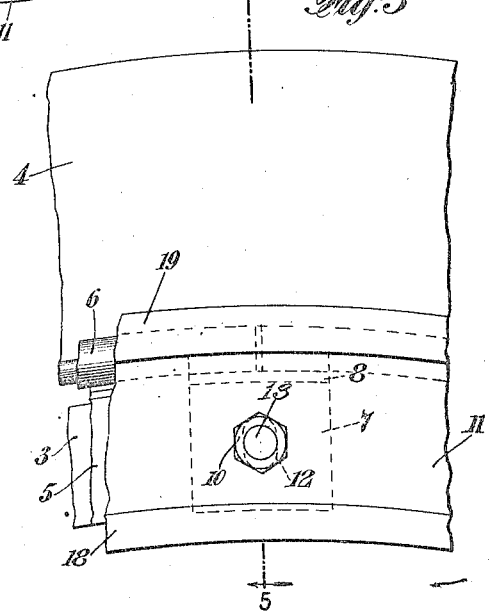
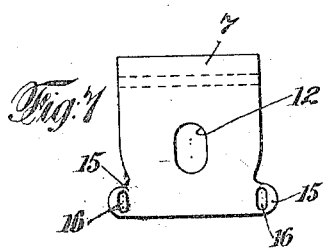
INVENTOR
Christian F. Weeber
BY
ATTORNEYS

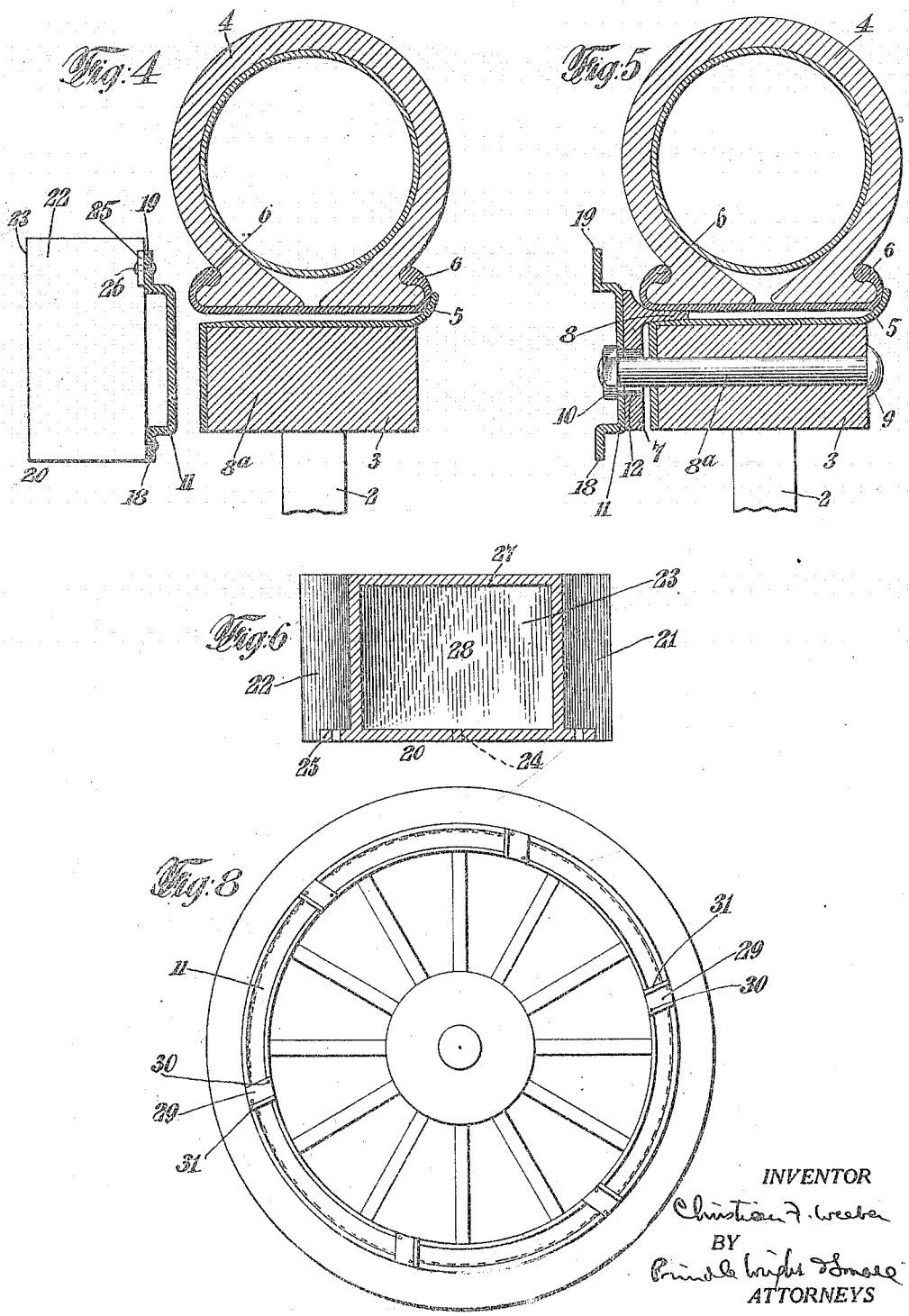

UNITED STATES PATENT OFFICE.

CHRISTIAN F. WEEBER, OF ALBANY, NEW YORK.

TRACTION DEVICE.

1,202,460.

Specification of Letters Patent.

Patented Oct. 24, 1916.

Application filed December 29, 1915. Serial No. 69,153.

*To all whom it may concern:*

Be it known that I, CHRISTIAN F. WEEBER, of Albany, in the county of Albany, and in the State of New York, have invented a certain new and useful Improvement in Traction Devices, and do hereby declare that the following is a full, clear, and exact description thereof.

My invention relates particularly to devices adapted to be attached to power driven wheels on vehicles, so as to enable more effective traction to be obtained.

The object of my invention is to provide a device of this character by means of which a power driven vehicle, as for example, an automobile, may be driven readily through snow, sand, soft ground, etc., but which is constructed, nevertheless, so that the vehicle may readily run upon hard surfaces, roads, etc. without interference from the traction device applied thereto in accordance with my invention.

The object of my invention is, furthermore, to provide such a device that in the operation of a vehicle having the same attached thereto, the tendency would be for the vehicle to ride over the top of any soft materials upon the downward movement of the traction device, which is attached to the wheel, and which will readily extract itself from the same upon the upward movement of the wheel.

A further object of my invention is to provide an apparatus of this character which may be readily attached and detached without difficulty and with a minimum amount of labor.

Another object of my invention is to provide a device of this character which will not interfere with the application of traction chains to the tires of the vehicle.

While my invention is capable of embodiment in many different forms, for the purpose of illustration I have shown only certain forms thereof in the accompanying drawings, in which, Figure 1 is a side elevation of a wheel equipped with my device; Fig. 2 is a fragmental side elevation of a portion of the same showing one of the traction lugs; Fig. 3 is a similar view of another portion of the same showing one of the wedging lugs; Fig. 4 is a transverse section of a portion of the same taken on line 4/4 of Fig. 2; Fig. 5 is a similar transverse section of a portion of the same taken on line 5/5 of Fig. 3; Fig. 6 is a section through one of the traction lugs; Fig. 7 is a side elevation of one of the movable wedging lugs; and Fig. 8 is a side elevation of a wheel showing a modified form of my invention.

In the drawings I have shown a wheel 1, which may be one of the power driven wheels on an automobile, the same having spokes 2, and a felly 3. The wheel 1 carries a pneumatic tire 4, which is held in place by a demountable rim device comprising an S-shaped inner ring forming a felly band 5, supported upon and extending over the outer side of the felly 3, and an outer rim 6. The wedging lugs or clamps which are ordinarily used in connection with the demountable rim device are substituted by wedging lugs 7, having wedging surfaces 8, which fit between the rings 5 and 6 and which are forced into position under pressure by means of bolts 8$^a$, passing through the felly 3, having heads 9 and nuts 10 on the other ends thereof. The bolts 8$^a$ also pass through a channel member 11, which may be made of cast or rolled steel, and to which are firmly secured, in any suitable manner, the wedging lugs 7. It will be noted that, as shown in Fig. 5, the wedging lugs 7 and the ring 11, attached thereto, are provided with slots 12 to permit the adjustment of the channel member 11 and its attached parts, while the wedges 8 are being forced against their seats. There are preferably six of the wedging lugs 7, each of which is provided with the central slot 12 for the passage of a bolt 13 and ears 15, provided with slots 16 for the passage of rivets 17, so as to loosely support the lugs 13 for movement radially of the wheel relative to the ring 11. The channel member 11 has an inwardly directed wing 18 and an outwardly directed wing 19, the latter being located such a distance below the outer tread of the tire 4, as not to interfere with the movement of the tire in the operation of the automobile. The channel member 11, which is located on the outer surface of the wheel 1, has attached to the wings 18 and 19 at intervals around the same a plurality of traction lugs 20, each of which has forward and rearward traction surfaces 21 and 22 arranged in the shape of a V, and a base plate 23, provided with a hole 24 and perforated ears 25 for attachment by means of rivets 26 to the channel member 11. If desired, each of the traction lugs 20 may, furthermore, be provided with a closure 27 on the outer surface thereof, as well as a closure 28 on the top thereof. As shown in Fig. 8, I may, if desired, use instead of the V-shaped traction lugs 20, angle irons 29 attached by rivets 30 to the channel member 11 and having laterally directed flanges 31 to engage the soft materials over which the automobile may be passing.

In the operation of my invention, when it is desired to attach the traction device to an automobile, the wedging lugs or clamps which are ordinarily found in demountable-rim tire-attaching devices are removed, and the channel member 11 with its attached parts is secured in place against the outer face of the power driven wheel 1 of an automobile by means of bolts 8ª, the wedges 8 being forced into place by said bolts 8ª, so as to simultaneously clamp the outer ring 6 and the inner ring 5 together so as to secure the tire 4 in place on the wheel and to firmly secure the channel member 11 and the traction lugs 20 thereon to the outer surface of the wheel. The slots 12 readily permit this to be done, thereby positioning the channel member 11 upon the wheel. When the wedging lugs 7 have in this way been securely seated on the wheel, the floating wedging lugs 13 are forced into place by the bolts 8ª passing through the same. The channel member 11 is now firmly secured to the outer face of the wheel around its entire periphery. When the automobile carrying the wheel is now driven into snow or any other soft material, the traction lugs 20, because of their position, readily pass into the body of the snow and tend to press firmly upon the same. Their angular position affords an effective strengthening means for said traction lugs so that they may effectively resist being moved or bent out of shape. Upon the upward movement of the portion of the wheel to which the particular traction lug 20 is attached, said traction lug 20 will readily extract itself from the soft material without disturbing the same to an undue degree because of the angular position of the parts thereof.

While I have described my invention above in detail, I wish it to be understood that many changes may be made therein without departing from the spirit of my invention.

I claim:

1. A wheel having a ring attached to one side of the same and a traction lug fixedly secured on one side thereof.

2. A wheel having a ring attached to one side of the same and a traction lug fixedly secured on one side on the outside thereof.

3. A wheel having a ring attached to one side of the same and a tire and a traction lug fixedly secured on one side thereof, the lug being closer to the center of the wheel than the tread of the tire.

4. A wheel having a ring attached to one side of the same and a tire and a traction lug fixedly secured on one side on the outside thereof, the lug being closer to the center of the wheel than the tread of the tire.

5. A wheel having a ring attached to one side of the same and a tire and a traction lug fixedly secured on one side thereof, the lug being closer to the center of the wheel than the tread of the tire, and beyond the innermost range of movement of the tread of the tire.

6. A wheel having a ring attached to one side of the same and a tire and a traction lug fixedly secured on one side on the outside thereof, the lug being closer to the center of the wheel than the tread of the tire, and beyond the innermost range of movement of the tread of the tire.

In testimony that I claim the foregoing I have hereunto set my hand.

CHRISTIAN F. WEEBER.